United States Patent [19]

Snelling

[11] 3,742,374

[45] June 26, 1973

[54] TRANSDUCER DEVICE

[75] Inventor: Christopher Snelling, Penfield, N.Y.

[73] Assignee: Xerox Corporation, Rochester, N.Y.

[22] Filed: June 9, 1971

[21] Appl. No.: 151,407

Related U.S. Application Data

[62] Division of Ser. No. 802,370, Feb. 26, 1969, Pat. No. 3,638,110.

[52] U.S. Cl. .................. 328/110, 328/2, 96/1 E, 96/1 R, 355/9
[51] Int. Cl. ................. G06g 5/00, G06g 15/00
[58] Field of Search................. 340/173.2; 235/181; 355/9; 328/110, 2; 96/1 E, 1 R, 1.1

[56] References Cited
UNITED STATES PATENTS

| | | | |
|---|---|---|---|
| 3,148,334 | 9/1964 | Danielson et al. .................. | 328/110 |
| 3,291,601 | 12/1966 | Gaynor .................................. | 96/1.1 |
| 3,615,389 | 10/1971 | Newberry ............................. | 355/9 |

Primary Examiner—John S. Heyman
Attorney—Paul M. Enlow, Laurence A. Wright et al.

[57] ABSTRACT

A transducer applying the Johnsen-Rahbek effect wherein the frictional force between two electrodes separated by electrostatically chargeable material is augmented by an increase in potential applied to the electrodes. The transducer measures or reads out the potential or charge patterns on the electrostatically chargeable material which may be a semiconductor, dielectric or other charge carrying surface and converts the force variations into electrical signals.

6 Claims, 5 Drawing Figures

Patented June 26, 1973   3,742,374

INVENTOR.
CHRISTOPHER SNELLING

BY *Lawrence A. Wright*

ATTORNEY

TRANSDUCER DEVICE

This application is a divisional of Ser. No. 802,370 filed Feb. 26, 1969 now U.S. Pat. No. 3,638,110.

This invention relates to a transducer means. More particularly, this invention relates to a transducer means which may detect through frictional force variations the potential or charge pattern on a semiconductor, dielectric or charge carrying surface and convert the force variations into electrical signals.

A system for scanning the charge patterns or potential on an electrophotographic plate is exemplified in U.S. Pat. No. 2,583,546. In that patent a probe having a potential thereon is placed in close proximity to but not contacting a charged surface of a drum. Suitable drive mechanism and carriage means are furnished so that probe may scan the drum surface. When a charged area of the drum lies adjacent the probe tip a voltage is induced in the probe. The probe is directly connected to the grid of an electron tube and the induced voltage on the probe changes the bias on the tube as the probe scans the electrically charged drum surface. The signal variations are amplified and sent to a detecting device or other utilization means, e.g., a facsimile recorder.

In the field of graphic reproduction the limit of resolution and sharpness at which an edge can be reproduced is of prime importance. Both resolution and sharpness are degraded by several factors. First, the optical image to which the electrostatic photoconductor is exposed; secondly, the degree to which the photoconductor can form and sustain the imposed optical charges; thirdly, the nature of the electrostatic field characteristic of the sharpness of charge definition found on the photoconductor.

The scanning of the electrophotographic plate in the above patented device, as already noted, is based upon induction coupling. One of the disadvantages of a system relying on induction coupling is the problem of maintaining sharpness of charge definition found on the charge carrying surface. In a system employing induction coupling the resolution is directly related to the spacing between the probe tip and the charged surface. So that if a 1 mil edge resolution is desired it will require a 1 mil spacing between the probe and the drum. Close spacing, although it would improve resolution, is hard to achieve because of mechanical reasons such as machine tolerances. In addition, where the charged surface is on a drum, spacing variations would occur as the fixed probe scans the fixed drum since it is practically impossible to construct a perfectly rounded drum. Moreover, with induction coupling there is the additional undesirable effect of current drift in probe bias which may arise from insulation leakage. The patent in question does not eliminate drift but seeks to avoid its effect by periodically grounding the grid of the electron tube.

It has been discovered that where two electrodes separated by a section of electrically chargeable material have the voltage potential applied between them increased, the frictional force between the electrodes and the electrically chargeable material is increased. This phenomenon is called the Johnsen-Rahbek effect.

The present invention applies the Johnsen-Rahbek effect in practical devices. It converts the frictional forces resulting from the Johnsen-Rahbek effect into electrical signals giving high resolution and avoids current drift. One embodiment of the invention contemplates a micro-electrometer probe for scanning an electrically chargeable surface and detecting the charge pattern thereon. Other embodiments employ a micro-probe in a simplified transmission system and in a coincidence detector. Further applications of the invention will be obvious to those skilled in the art from the description which follows.

It is an object of this invention to provide a means for sensing the surface charge distribution of a semiconductor, a dielectric or the like.

It is a further object of this invention to provide a means for converting a varying frictional force into a varying electrical signal.

It is another object of this invention to provide means for detecting latent electrostatic images on photoconductors or photoreceptors.

A further object of this invention is to provide a simplified transmission system and a coincidence detector.

These and further objects of the present invention will be more fully understood by reference to the description which follows and the accompanying drawings wherein.

The application of the Johnsen-Rahbek effect is proposed as a means for measurement or readout of potential or charge patterns on photoconductor, semiconductor, dielectric surfaces or the like. The experiments which Johnsen and Rahbek conducted were made using semiconductors such as lithographic stone, agate, marble, flint and ivory. However, later investigators of the effect have used electronic semiconductor material which do not rely on the presence of moisture as the materials employed by Johnsen and Rahbek did. Some of the electronic semiconductor material which have been successfully tested are disks pressed from a powdered mixture of magnesium and titanium oxides fired and reduced in hydrogen and selenium, coating or overlying a base plate. These electrically chargeable materials yield results which essentially conform to the results achieved by Johnsen and Rahbek. Other usable semiconductors might be flexible materials of high resistivity such as Mylar or Teflon discussed in U.S. Pat. No. 3,023,731.

Figure 1:
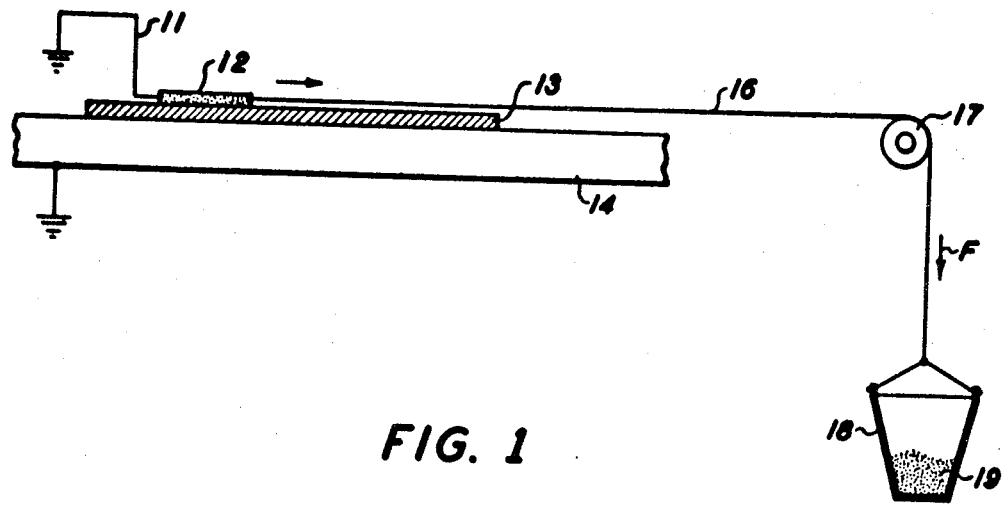
FIG. 1 shows a method of measuring frictional force.
Figure 2:
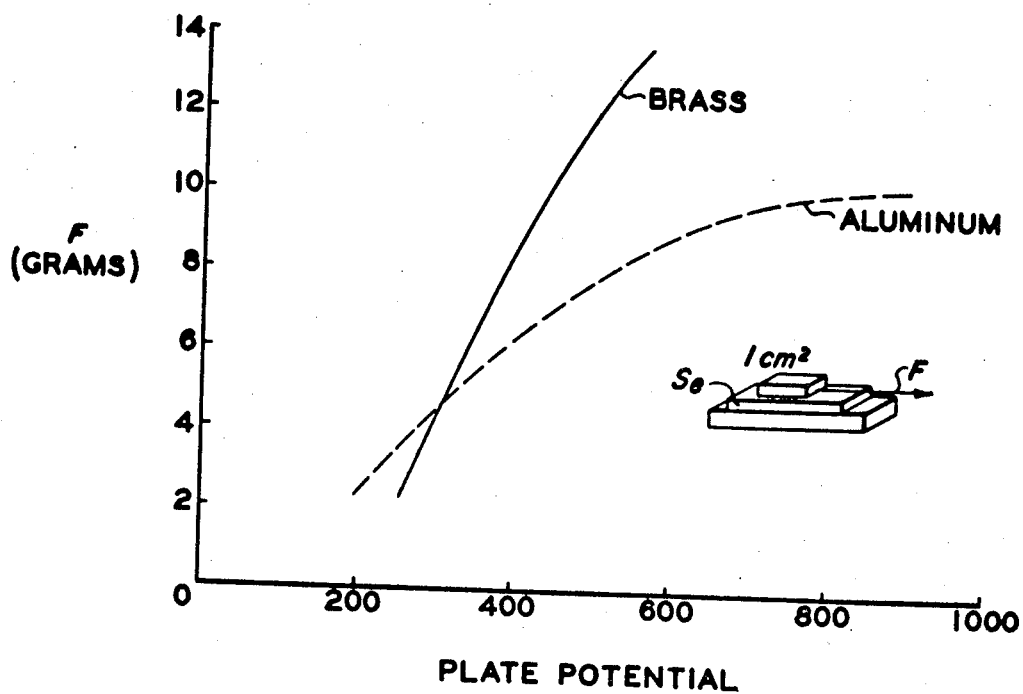
FIG. 2 shows the relationship between frictional force and voltage of the elements of FIG. 1.

Referring now to FIGS. 1 and 2, there is shown an apparatus which in general demonstrates the attractive forces exerted between the electrodes and a charged semiconductor. Reference symbol 11 is a grounded wire connected to a block 12 having a 1 cm$^2$ contact area. In the experiment, tests were conducted using both aluminum and brass blocks. The charged selenium semiconductor 13 which in this instance may be approximately 50 microns thick is supported on or permanently affixed to conductive base plate 14. The contacting surfaces of the brass or aluminum block 12 and the semiconductor 13 are polished to a smooth condition such that there are several points of intimate contact between their surfaces. Plate 14 upon which the selenium is coated or affixed is at ground potential and may be any suitable metal which does not deleteriously react with the photoconductor or chargeable material, e.g., zinc, aluminum or brass. A thread 16 is connected at one end to block 12 and the other end is connected to cup 18 containing weight material 19. The thread 16 is stretched over idler roller 17 so that a force, F, is exerted downward on the thread by the cup 18 containing the weight material.

In the experiment, the selenium semiconductor was charged and its potential measured with a suitable vacuum type voltmeter. The amount of weight necessary to maintain constant motion of the block 12 across the surface of the charged plate was found to be a function of the potential applied between the block and the plate serving as electrodes. The friction of the thread over the idler roller was not determined but it is expected that it would approximate a constant error.

It is understood that the description of the above experiment is merely to explain the Johnsen-Rahbek phenomenon and not meant to be rigidly definitive of the effect. There are in the literature reports by investigators who have performed exhaustive experiments on the Johnsen-Rahbek effect, e.g., see "Johnsen-Rahbek Effect With An Electronic Semiconductor," C. Balakrishnan, *British Journal of Applied Physics*, pp. 211-213 (1950). This article also provides examples of how to make the semiconductor materials discussed above.

FIG. 2 shows graphs of test runs using brass and aluminum blocks. The ordinate axis of FIG. 2 gives the force in grams exerted upon the block and the abscissa gives the potential on the semiconductor in volts. The frictional force is clearly shown from the two graph curves to be dependent upon the potential. More specifically, the graph for the brass block test run shows that a 50 volt increase in potential caused an approximately 2 gram increase in the frictional force. The aluminum block test run graph shows a slope which was not as steep as that of the brass block. However, both graph curves confirm the teaching of the Johnsen-Rahbek phenomena.

Figure 3:
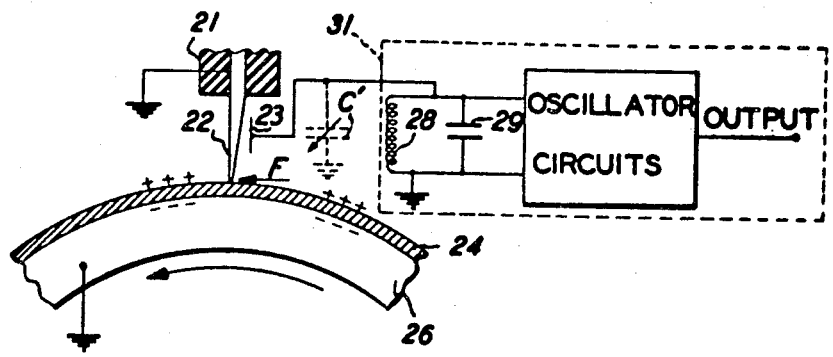
FIG. 3 shows a force transducer with oscillator means.

Referring now to FIG. 3, there is shown a force transducer applying the Johnsen-Rahbek effect having a grounded microprobe 22. Numeral 21 is a semi-rigid non-conductive mounting which may be made of rubber or the like for yieldingly supporting microprobe 22. A selenium photoconductor 24 is coated or deposited on a drum base 26 which is shown at ground potential. While in this instance probe 22 and drum base 26 are shown at ground potential successful results can be achieved where these elements are at a potential other than ground. Furthermore, although a selenium semiconductor is described it will occur to those skilled in the art that any electrostatically chargeable material could be substituted in lieu thereof. Drum base 26 may be made of zinc, aluminum, brass or any suitable metal which will not drain off the charge placed on the selenium photoconductor. In capacitive relationship with the microprobe is a plate 23. Plate 23 in conjunction with microprobe 22 form a variable capacitor c' with air as the dielectric medium. Plate 23 is connected to an LC tank circuit comprising inductor 28 and capacitor 29. The LC tank circuit is connected in parallel with oscillator control circuits. The oscillator means 31 may be any conventional FM modulator or the like having suitable amplification and control means.

In the operation of FIG. 3, the drum base 26 carrying the selenium photoconductive layer 24 is rotated at a suitable speed in the direction of the arrow. The selenium coating shown in contact with microprobe 22 has a charge along its surface as indicated which may be placed thereon by any suitable charging device. A force F, is exerted on the microprobe as a function of the charge on the selenium photoconductive layer 24. The variation in force on the microprobe alters the capacitance between it and plate 23. These changes in capacitance cause oscillator means 31 connected to plate 23 to be frequency modulated. The oscillator provides at its output a signal which varies in accordance with the Johnsen-Rahbek effect. That is, as the potential between the electrodes changes the frictional force, F between the microprobe and the selenium photoconductor also changes.

The fact that microprobe 22 is grounded and in contact with the photoconductive material 24 might make it appear that the charge on the photoconductor would leak off through the grounded probe. Although there is some small leakage present the amount is negligible. The area of the microprobe in contact with the photoconductor is quite small and since the microprobe and photoconductor are solids there are few points of intimate contact between them which would permit a large leakage. Whatever leakage there is occurs only in the contact areas of the microprobe and photoconductor. Consequently, those charged areas not in contact with the microprobe are unaffected. Moreover, the photoconductor is an extremely good insulator and is strongly resistant to current flow.

Figure 4:
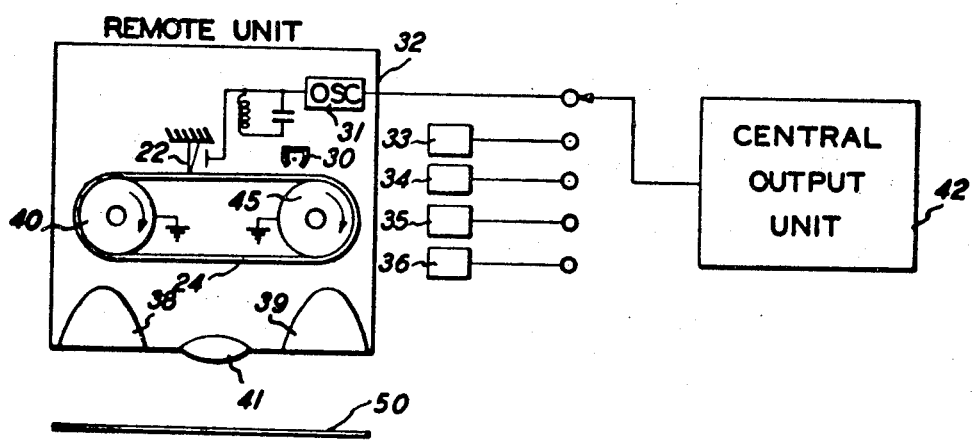
FIG. 4 shows a force transducer with a simplified transmission system.

Referring to FIG. 4, there is shown a method of utilizing the Johnsen-Rahbek effect in a simplified transmission system. A plurality of Remote Units 32, 33, 34, 35 and 36 contain microprobe devices as discussed in FIG. 3 above for sensing the charge pattern on photoconductive belt or web 40 of a transmission system. The outputs from the remote units are then fed to a Central Output Unit for monitoring, processing, recording or utilization. Alternatively, the device disclosed in FIG. 4 could form the basis for a simplified facsimile system.

In operation of the remote unit, the photoconductive belt or web 40 as it rotates in the direction of the arrow is uniformly charged by a corotron 30 or any other suitable electrostatic charging device. At a predetermined time strobe lamps 38 and 39 are turned on to expose a document 50 to be reproduced. Other exposure devices such as a shutter arrangement may be satisfactorily used in lieu of strobe lamps 38 and 39 and would be considered within the scope of the invention. The image from the document is focused on to the photoconductive belt by lens 41 whereupon a latent electrostatic image is formed on the belt according to conventional electrophotographic principles. Subsequently, the charged belt is detected by the scanning microprobe in accordance with Johnsen-Rahbek effect already described and is amplified. An output signal representing the charge pattern on belt 40 is transmitted from the remote unit to the control output unit 42 for recording, processing or utilization.

Figure 5:
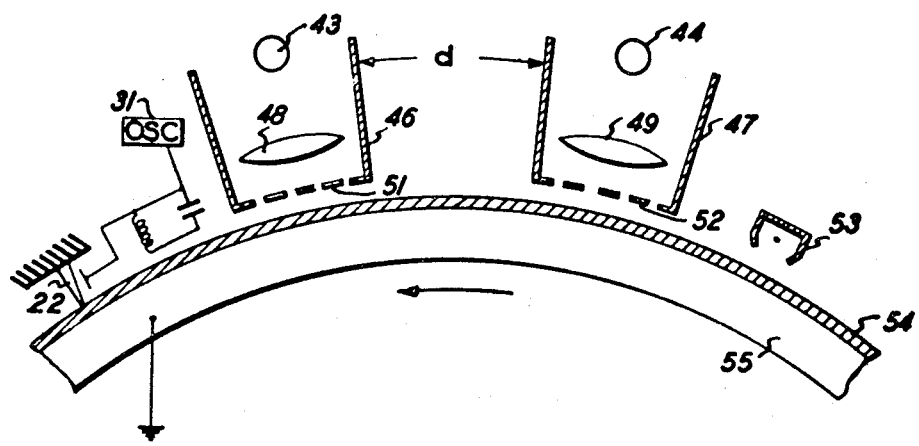
FIG. 5 shows a force transducer used in a coincidence detector. The same elements have the same reference numerals in the various figures.

Referring now to FIG. 5, there is shown yet another application of the Johnsen-Rahbek effect. More specifically, there is shown a means to accomplish coincidence detection over long periods of time. A first light source 43 is disposed at one end of an optical shield 46. Disposed at the other end of shield 46 is an optical grid 51 which emits light focused into parallel beams by lens 48. Lens 48 is spaced from light source 43 by a predetermined amount necessary to concentrate the light into parallel beams and lies close to optical grid 51. A second light source 44 disposed within shield 47 is separated a predetermined distance *d* from the shield 46. Lens 49 as in the case of lens 48 focuses the light emitted from optical grid 52 onto the photoconductor 24. A corotron 53 or other suitable charging device uniformly charges the photoconductor 24 as it is rotated past the light sources and detecting means. The microprobe 22 in conjunction with plate 23 and oscillator 31 detect in accordance with the Johnsen-Rahbek effect the exposed photoconductor surface for coincidence. More specifically, the two light sources 43 and 44 sequentially expose a given area of the photoconductor surface through the optical grids. The coincident exposure of the same areas of the photoconductor by 43 and 44 is determined by the photoconductor surface speed and/or the adjustable physical spacing *d* between 46 and 47. A null condition whereby light sources 43 and 44 in sequence, totally discharge a given area of the photoconductor could also be detected by the detecting means. Moreover, light sources 43 and 44 could be actuated by receive and transmit signals respectively of a monitoring device. In such a case the detection system could monitor the time lapse between the transmitted and the received signal. An alternate coincidence detector may comprise a discharging means such as an infra red generator for applying heat in order to discharge the electrostatic material in lieu of the light sources and optics described. In that system a suitable electrostatic material would be substituted for the photoconductor described herein.

From the foregoing, it is understood that the transducer apparatus described applied the Johnsen-Rahbek effect to measure or read out the potential or charge patterns on semiconductor dielectric or photoconductive surfaces.

What is claimed is:

1. A coincidence detector comprising:
    photoconductive means adapted to hold an electrostatic charge thereon,
    means for placing an electrostatic charge on said photoconductive means,
    a first means for exposing a given area of said photoconductive means,
    a second means for exposing said given area of said photoconductive means at a predetermined time following the exposure by said first means,
    a probe adapted to contact said photoconductive means for reading out the electrostatic charge thereon,
    means for moving said photoconductive means relative to said probe means,
    means connected to said probe means for detecting the frictional force variations on said probe resulting from the relative motion between said probe and photoconductive means, and
    means connected to said detecting means for converting said force variations into electrical signals indicative of the coinciding exposed given area of said photoconductive means.

2. The apparatus of claim 1 wherein said detecting means comprises a plate connected in capacitive relation to said probe and wherein said probe is adapted to be yieldingly mounted upon a support means.

3. The apparatus of claim 2 wherein said converting means comprises an oscillator circuit connected to said plate whereby the variation in capacitance between said plate and said probe modulates the frequency of said oscillator.

4. The apparatus of claim 3 wherein said first and second exposure means are adjustably separated from each other by a predetermined amount and wherein each comprises an optical shield containing a light source at one end and a lens and optical grid at the other end.

5. The apparatus of claim 4 wherein said first exposure means is activated by a first signal and wherein said second exposure means is activated by a second signal.

6. The apparatus of claim 5 wherein said first exposure means discharges by a certain amount said given area of said photoconductive means and said second exposure means discharges the remainder of the same area of said photoconductive means whereby said detecting means detects a null condition.

* * * * *